United States Patent
Summerford et al.

(10) Patent No.: US 7,244,050 B2
(45) Date of Patent: Jul. 17, 2007

(54) FULL CUTOFF AREA LIGHT FIXTURE

(75) Inventors: Robert Summerford, Selma, TX (US);
Claude Barozzini, Austin, TX (US);
Jerome H. Simon, Newton Centre, MA (US)

(73) Assignee: Genlyte Thomas Group, LLC, Louisville, KY (US)

( * ) Notice: Subject to any disclaimer, the term of this patent is extended or adjusted under 35 U.S.C. 154(b) by 0 days.

(21) Appl. No.: 11/041,755

(22) Filed: Jan. 24, 2005

(65) Prior Publication Data

US 2005/0281034 A1    Dec. 22, 2005

Related U.S. Application Data

(60) Provisional application No. 60/538,620, filed on Jan. 23, 2004.

(51) Int. Cl.
*F21V 5/00* (2006.01)
(52) U.S. Cl. ............... 362/327; 362/299; 362/302; 362/336; 362/338
(58) Field of Classification Search ............ 362/215, 362/223, 299, 302, 327–329, 336, 338, 346
See application file for complete search history.

(56) References Cited

U.S. PATENT DOCUMENTS

| | | | | |
|---|---|---|---|---|
| 1,794,839 A | * | 3/1931 | Dorey | 362/332 |
| 3,562,513 A | * | 2/1971 | Jaffe | 362/305 |
| 4,234,912 A | * | 11/1980 | Barnes et al. | 362/145 |
| 5,897,201 A | | 4/1999 | Simon | |
| 5,915,823 A | | 6/1999 | Simon | |
| 6,338,564 B1 | * | 1/2002 | Jordan et al. | 362/346 |
| 6,361,191 B1 | | 3/2002 | Simon | |
| 6,502,964 B1 | | 1/2003 | Simon | |
| 6,536,921 B1 | | 3/2003 | Simon | |
| 6,540,382 B1 | | 4/2003 | Simon | |
| 6,543,912 B1 | | 4/2003 | Simon | |
| 6,561,670 B1 | * | 5/2003 | Jongewaard et al. | 362/147 |
| 6,616,305 B1 | | 9/2003 | Simon | |
| 6,783,261 B2 | | 8/2004 | Simon | |
| 6,851,833 B1 | | 2/2005 | Simon | |
| 6,874,914 B2 | * | 4/2005 | Desanto et al. | 362/372 |
| 7,160,002 B2 | | 1/2007 | Simon | |

* cited by examiner

*Primary Examiner*—Sandra O'Shea
*Assistant Examiner*—Jason Moon Han
(74) *Attorney, Agent, or Firm*—Steve A. Witters; Middleton Reutlinger

(57) ABSTRACT

A full cutoff luminaire having a housing with an open bottom, a vertically mounted lamp centrally located within the housing, a radial reflector surrounding a portion of the lamp and a downwardly extending optic lens having an open top enshrouding a lower portion of the lamp wherein light emitted from the luminaire does not exceed 90° above nadir.

21 Claims, 8 Drawing Sheets

FULL CUTOFF AREA LIGHT FIXTURE

CROSS-REFERENCE TO RELATED APPLICATIONS

This application claims priority to and benefit from U.S. application Ser. No. 60/538,620, filed Jan. 23, 2004, which is incorporated herein by reference.

TECHNICAL FIELD OF THE INVENTION

The present invention relates generally to the lighting field, and, more particularly, to full cutoff radial luminaires having a high intensity discharge lamp for lighting a large area.

DESCRIPTION OF THE PRIOR ART

In the past, large surface areas (i.e. parking lots) have been illuminated with luminaires having a high intensity discharge lamp, reflector(s), and a flat or sag lens covering the bottom of the luminaire. Flat lenses have been found not to be very efficient in allowing the light to pass through since much of the incident light is not normal to the lens and is therefore reflected back into the luminaire. For instance, it has been determined that approximately up to 20% of 70° incident light reflects back into the luminaire. This greatly reduces the efficiency of the luminaire.

Sag or bowl shaped lenses are typically of a constant thickness and have a surface that is more normal to the incident light and are thus more efficient than the flat lens. However, the sag lens does not provide for a full cutoff luminaire. A full cutoff luminaire, as in the present invention, is a luminaire that has a light distribution of zero candela intensity occurring at 90° and all greater angles above nadir. Additionally the candlepower per 1000 lamp lumens does not numerically exceed 100 (10%) at a vertical angle of 80° above nadir. This applies to all angles around the luminaire. The IESNA Lighting Handbook, 9$^{th}$ ed., pg. 7–8. The sag lens projects light above the angle of 90° above nadir. In some jurisdictions the sag lens luminaires are forbidden because of light pollution issues. Sag lenses are also less efficient since light is projected above 90° nadir rather than on a predefined area below. Additionally, the sag lens exhibits an intense glare which makes it extremely unpleasant to look upon.

Therefore, both the flat lens and the sag lens are very inefficient in providing light to a relatively large area. Additionally, both lenses of the prior art allow the direct down light coming from the lamp or reflectors to light a circular area beneath the luminaire rather than efficiently spreading the light out to areas that are intended to be illuminated. Thus, both the flat and sag lenses have been found to be inefficient for lighting a large area.

SUMMARY OF THE INVENTION

One object of the present invention is to create a full cutoff luminaire that efficiently distributes light over a large area.

Another objective of the present invention is to provide a less intense, non-glaring luminaire.

A further object of the present invention is to create a predetermined distribution pattern of illumination from a luminaire that houses a high intensity discharge lamp.

Yet another object of the present invention is to create a predetermined illumination pattern being more evenly distributed 360° area around the luminaire.

An additional object of the present invention is to efficiently project a predetermined illumination pattern of rectangular areas over a 360° area surrounding the luminaire.

These objects and others are accomplished according to the present invention by providing a luminaire for creating an efficient predetermined light pattern on a large surface area.

The luminaire includes light source, preferably a high intensity discharge (HID) lamp, having an arc tube and being arranged vertically within the luminaire. This vertical arrangement provides for an optimum efficiency and life of the lamp. One or both of two separate and distinct transparent lenses in conjunction with reflecting surfaces provides a luminaire that accomplishes the aforementioned objectives. These objectives are achieved by having the lens(es) and reflecting surfaces within a housing and by either reflecting or refracting the majority of light from the lamp to form a predetermined pattern on the area below.

The luminaire of the instant invention has two reflectors within a housing which operate independently of each other. The upper reflector is a frustoconical reflector having a flat top positioned above and near the light source for reflecting the up light from the lamp toward the bottom of the luminaire. The frustoconical side wall has planar rib shaped facets which reflect light directly toward the area to be illuminated.

The second reflector is a radial frustoconical reflector which encircles the lamp at a distance from the lamp and reflects the radial light from the lamp directly toward the predetermined area to be illuminated. Both of these reflectors have flutes or ribs in their frustoconical reflective surfaces that are defined by planar raised facets interposed with planar lower facets that run between the upper and lower ends of the frustoconical sections of the reflectors. These flutes provide for a uniform annular illumination. Additionally, the flutes in conjunction with the angle of the frustoconical side walls are such that much of the incident light is reflected to the desired area of illumination while minimizing the light being reflected or refracted a second time. These reflectors have been determined to be approximately 80–90% efficient in directing light to the predetermined area. The predetermined area for evenly and efficiently lighting a large area has been found to be a full cutoff partial spherical distribution having a circular main beam at approximately 70° up from nadir. This distribution may include a square or rectangular pattern within the spherical distribution to avoid overlapping light patterns from a plurality of luminaires, thus further increasing the efficiency of lighting a large area.

In an embodiment of the present invention, the luminaire has two separate and distinct lenses within its housing and are each comprised of a transparent refractive material such as glass or plastic. These lenses may be incorporated into the luminaire individually or together. Therefore, all reflecting and refracting surfaces are contained within a housing and do not protrude outside of the housing. This configuration provides for a full cutoff luminaire.

The lenses and reflectors are positioned in the luminaire so that the much of the light from the lamp is either singularly reflected or singularly refracted to a predetermined area. Thus, the inefficiency of refracting and/or reflecting the light a plurality of times, as in the prior art, is reduced. For example, luminaires in the prior art having had an arrangement of reflectors and lenses so that light is reflected onto a refracting lens and this configuration has been shown to loose about 8% efficiency.

In another embodiment, a cup shaped optic lens is positioned directly below the lamp and may enshroud a lower portion of the lamp. The optic lens may have smooth surfaces or it may incorporate unique refractive characteristics. An embodiment of the optical lens has a frustoconical side wall and a disc shaped bottom enclosing the narrow end of the frustoconical sidewall. The lens has an open top forming a cavity that may partially enshroud a bottom portion of the lamp and redirects the downward light components from the lamp to the predetermined area to be illuminated (i.e. partial spherical pattern having a circular main beam being approximately 70° from nadir).

Another embodiment of the optic lens eliminates the glare that is exhibited by the sag lens of the prior art. This is accomplished by having rounded prisms comprised of ribs or partial cylindrical shaped ridges inside of the frustoconical side wall and extending vertically. This feature spreads the light axially to the left and right and thus eliminates the unpleasant bright glare effect that is exhibited by the sag lens in the prior art. This feature causes the whole lens to glow and appear as a less intense light and is more pleasant to look upon than the sag lens of the prior art. The disc shaped bottom of the optic lens also has refractive characteristics that redirect the down light from the lamp. The disc shaped bottom has a planar bottom and a top surface having prisms comprised of facets having planar raised edges and planer lower edges that run around the disc at constant intervals. This inner refractive surface also spreads the light from the lamp causing the optical lens to glow and appear as a less intense lamp, thus the whole optic lens glows and the unpleasant bright glare of the sag lens found in the prior art is reduced.

The refractive characteristics of an embodiment of the optic lens for lighting a predefined area are accomplished by first having a prism comprised of a partial fresnel lens in the outer frustoconical side wall. This feature redirects light from the lamp directly to the predetermined large area to be illuminated. An efficient distribution of light to illuminate a predefined large area has been found to be a partial spherical pattern (i.e. full cutoff, not to exceed 90° from nadir) having a main beam of approximately 70° from nadir to zenith, thus the lens refracts a majority of the light from the lamp to approximately 50° to 90°, more desirably from 60° to 80°, and yet more advantageously from 65° to 75° from nadir to zenith.

The diameter of the bottom disc of this embodiment is such that the desired amount of down light is provided to the area below the luminaire which is illuminated at an intensity approximating the radial area around the luminaire. Thus the bright circle beneath the luminaire of the prior art is reduced and the light is evenly and efficiently distributed to the desired areas.

Another embodiment of the luminaire of the present invention incorporates a lens which is in the shape of an inverted cone and encloses a bottom portion of the luminaire. This configuration in conjunction with the reflectors increases the efficiency of the luminaire over the flat lens of the prior art without producing the bright glare or up light that is exhibited by a sag lens. Efficiency of a lens is increased when the incident light is closer to normal or 90° to the lens. When incident light varies from normal to the lens, a larger percentage of the incident light is reflected back into the luminaire and consequently reduces the efficiency of the luminaire.

The bottom flat lens of the prior art provides only a small portion of direct down light to be normal to the lens and thus reflects much of the incident light back into the luminaire. For instance, it has been determined that approximately up to 20% of 70° incident light bounces back into the luminaire. This causes the light to be reflected and/or refracted a plurality of times before leaving the luminaire, thus greatly decreasing the efficiency of the luminaire. In the past, this inefficient reflecting of down light was reduced by having a sag lens. Even though the sag lens provides a more normal surface to the lamp, it produces an unpleasant bright glare and projects light above the angle of 90° above nadir.

The inverted conical shaped bottom lens of the instant invention provides a surface that is nearer normal to the incident light than a flat lens and does not exhibit the bright glare of a sag lens. This is accomplished by reflecting the radial portion of the light from the lamp with the radial frustoconical reflector to the predetermined area of illumination and having the inverted conical shaped lens of the instant invention on the bottom portion of the luminaire. Since the lamp is a HID lamp and having the arc tube installed vertically provides for its most efficient operation, much of the light being emitted from the lamp is in a radial direction. This light is reflected to a predetermined area by the axial reflector, having a main beam predominately 70° from nadir. Thus, having a lower inverted conical lens provides a more normal surface to the incident light coming from the radial reflector than does a flat lens and substantially increases the efficiency of the luminaire. This inverted conical lens may have a point at its center directly beneath the lamp or may have a circular hole at its center. Having a hole at the center of the lens allows the conical bottom lens to encircle a portion of the lamp and/or an optic lens if so desired. Additionally, an alternative embodiment of the bottom lens may is an inverted sag or bowl shaped lens. This configuration presents a cost savings in the manufacturing process over the inverted conical lens. The inverted sag lens may as well have a hole at its center for receiving a portion of the lamp and/or an optical lens.

DETAILED DESCRIPTION OF THE INVENTION

Figure 1:
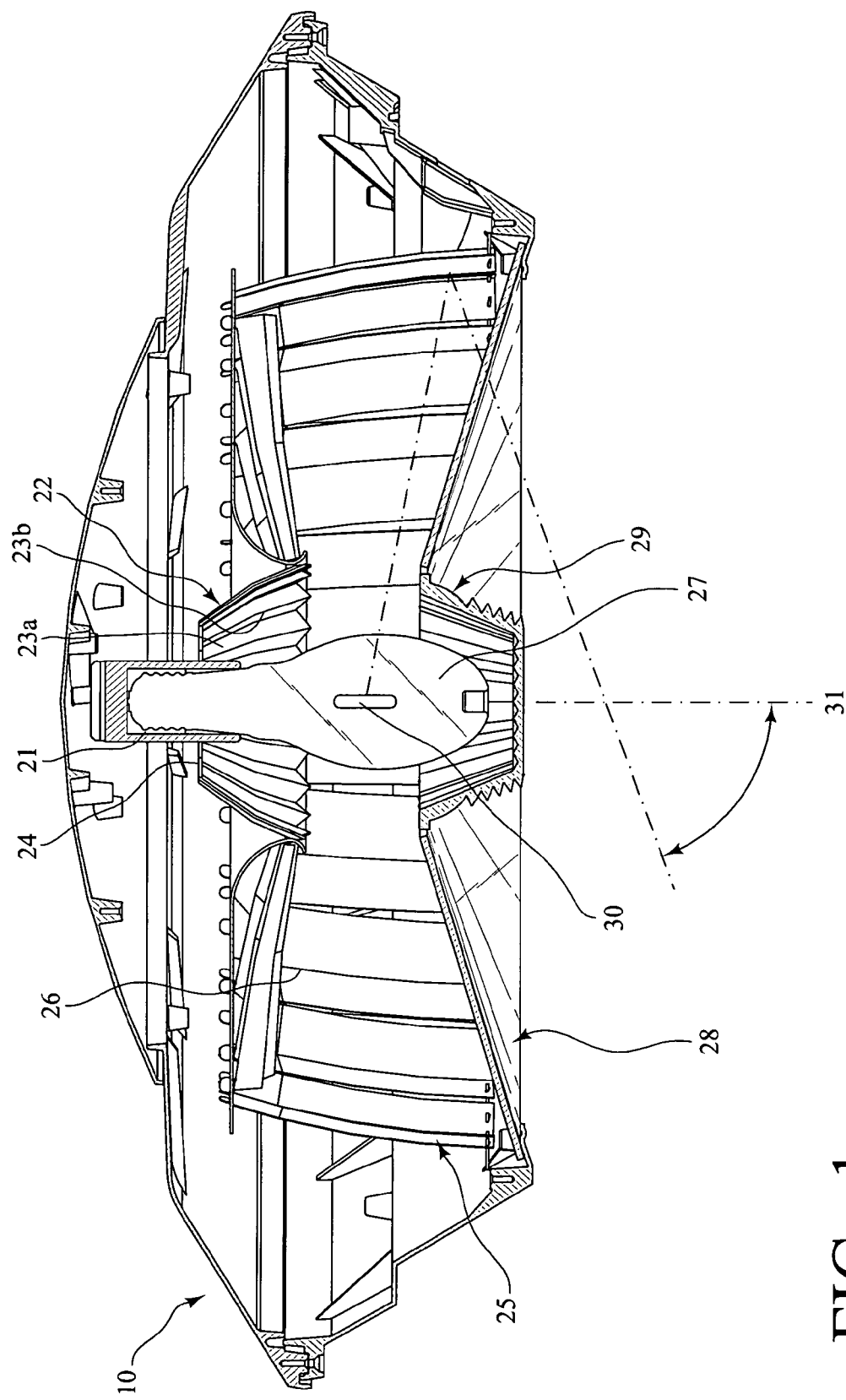
FIG. 1 is a cross-sectional view of a luminaire of the present invention showing a HID, upper reflector, axial reflector, optical lens, inverted conical or inverted sag lens, and their placement within a housing.

The invention, both as to organization and method of operation, may best be understood by reference to the following description taken in conjunction with the accompanying drawings of which:

FIG. 1 is a cross-sectional view of an embodiment of the full cutoff luminaire of the present invention. The luminaire is designed to project 360° of radial illumination towards and evenly onto an architectural surface below. This embodiment of the luminaire is shown to be comprised of four optical elements contained within and above the lower edge of an open bottom housing 10: an upper reflector 22; a radial reflector 25; an inverted conical lens 28; and an optical lens 29.

Upper reflector 22 is designed to reflect a vertical segment of light radiation from lamp 27 or arc tube source 30 where HID lamp 27 is vertically installed in lamp holder 21. Lamp holder 21 is centrally mounted in housing 10 above a lamp region within housing 10. The upper reflector 22 projects a portion of up light from lamp 27 to the lower portion of the luminaire. Upper reflector 22 has a flat disc shaped top 24 and a downward depending frustoconical side wall 23a. The frustoconical side wall 23a has flat sided ribs or flutes 23b which disperse the light in a horizontal axis. The frustoconical sidewall 23a projects the light downwardly and having a main beam of approximately 50° to 90°, more desirably from 60° to 80°, and yet more advantageously from 65° to 75° from nadir 31. The flutes 23b project the light that would have passed through lower optic lens 29 horizontally around optic lens 29. Consequently, most of the up light emitted from lamp 27 is reflected downwardly out of the luminaire without being reflected or refracted again, thus maximizing the luminaires efficiency.

The radial reflector 25 is a frustoconical reflector that projects the majority of light emitted from lamp 27 axially out of the luminaire in a partial spherical pattern, not exceeding 90° above nadir, having a main beam at approximately 50° to 90°, more desirably from 60° to 80°, and yet more advantageously from 65° to 75° from nadir 31. This reflector also has flutes 26 which project the light that would have passed through lower optic lens 29 horizontally around optic lens 29. Since lamp 27 is a vertically mounted HID lamp having arc tube 30, the majority of light being emitted from lamp 27 is in a radial direction and thus is reflected by axial reflector 25 to a predetermined area. This predetermined area encompasses a 360° distribution. This distribution is of a uniform intensity and is created by providing a full cutoff partial spherical projection having a main beam being approximately 50° to 90°, more desirably from 60° to 80°, and yet more advantageously from 65° to 75° from nadir 31.

Figure 2:
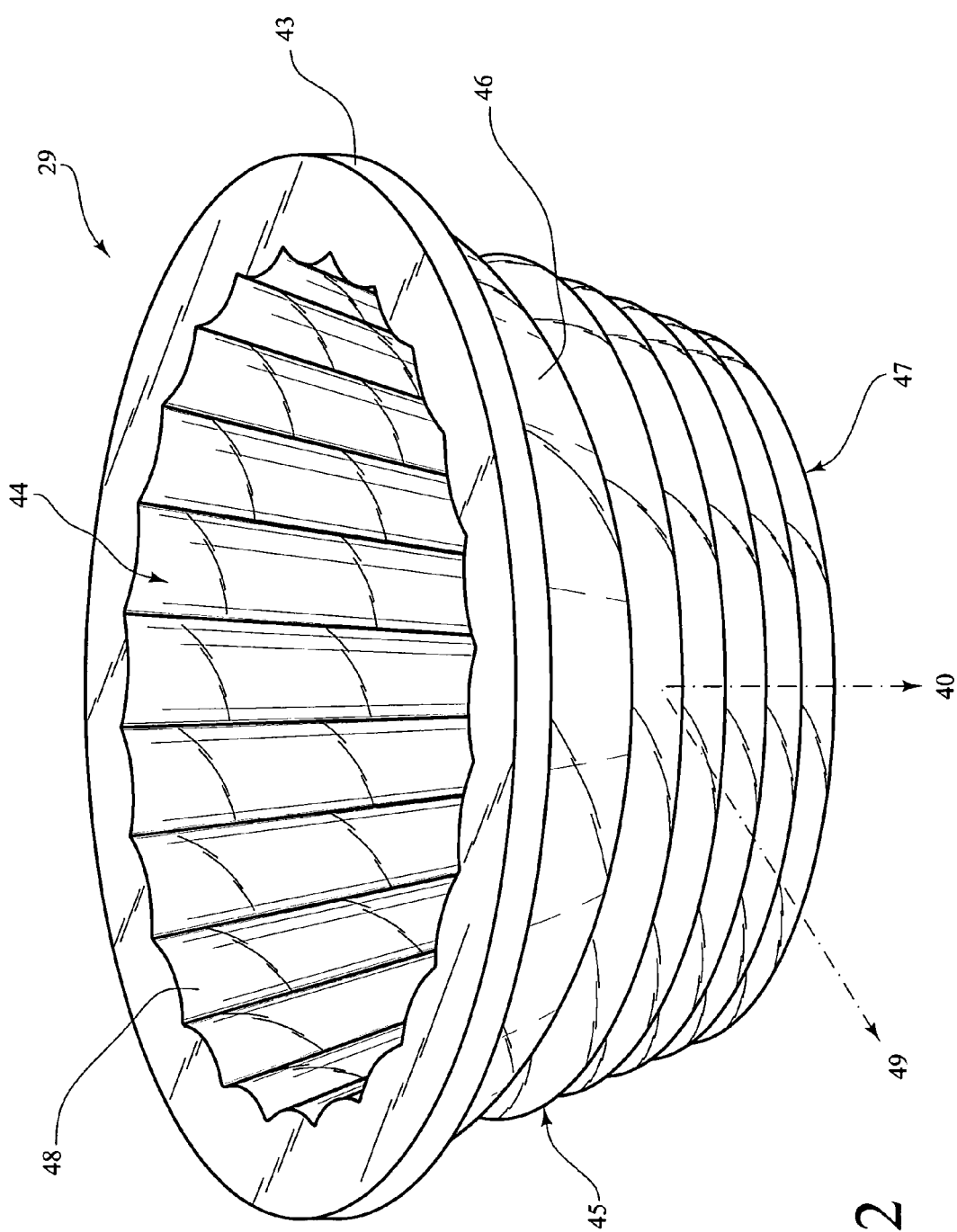
FIG. 2 is an isometric view of an embodiment of the optic lens of the present invention showing two distinct refractive surfaces.

FIG. 2 is an isometric view of an embodiment of the optic lens 29 of the present invention. This embodiment of the optic lens has a frustoconical sidewall with an upper circumference which is larger than its lower circumference. Optic lens 29 comprises an outwardly extending flange 43 around its upper circumference. Extending downwardly from this flange 43 is a frustoconical sidewall 45. The frustoconical sidewall 45 has a prismatic outer surface comprising a radial lens 46 and an inner surface having an axial lens 48. Inwardly depending from the frustoconical sidewall 45 is a lower disc shaped refracting lens 47 that encloses the bottom of optical lens 29. The frustoconical sidewall 45 and the lower refracting surface 47 together form a cup shaped lens having a cavity 44 which may enshroud a lower portion of lamp 27. Light ray 40, in the direction of nadir 12, illustrates the general vertical direction of the main beam of the light from lamp 27 passing through the lower refracting surface 47. Light ray 49 illustrates the general direction of the main beam of light from lamp 27 passing through radial lens 46, generally this main beam 49 is a part of a partial spherical illumination and is approximately 50° to 90°, more desirably from 60° to 80°, and yet more advantageously from 65° to 75° from nadir 31.

Figure 3:
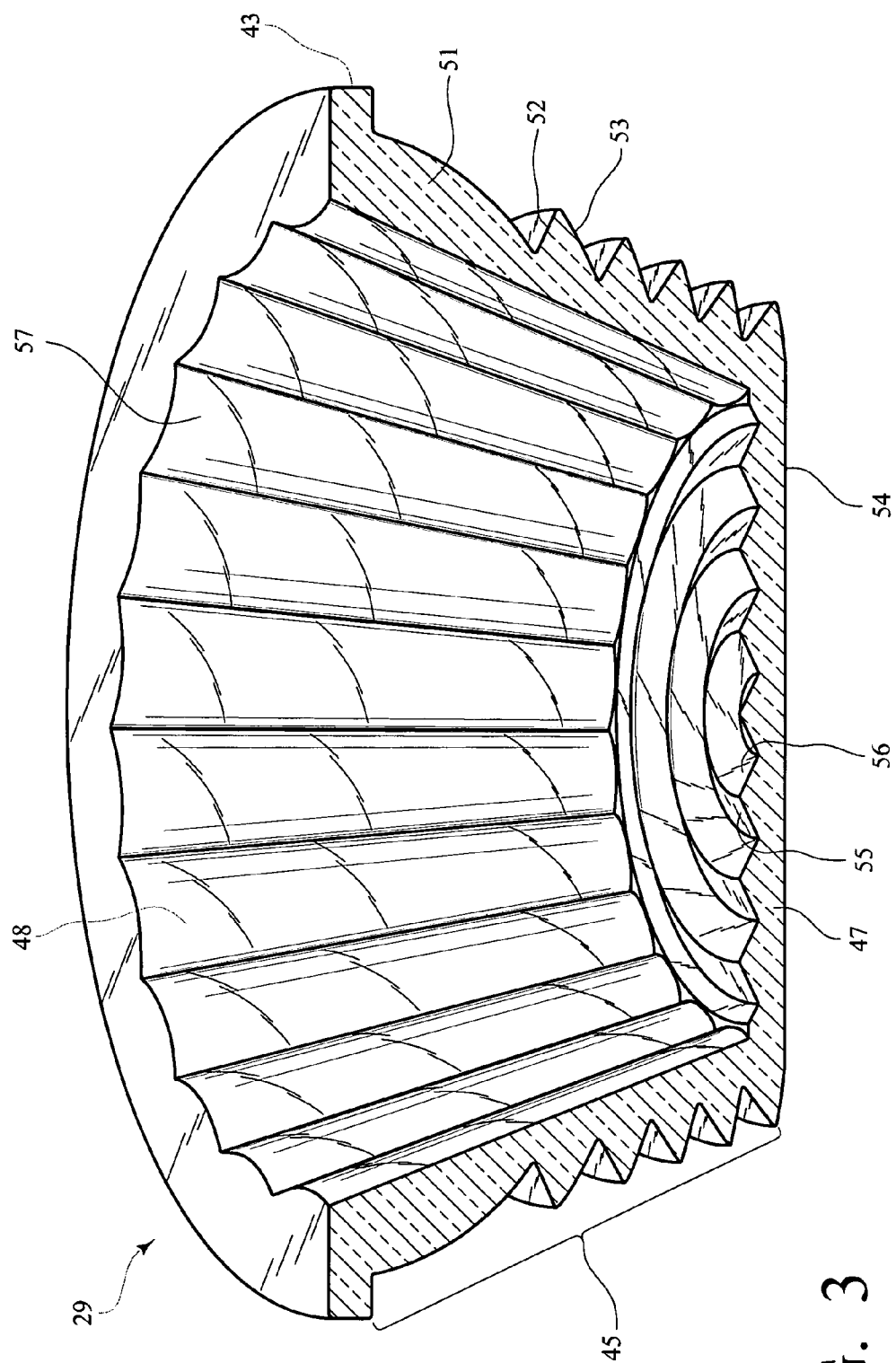
FIG. 3 is a cross-sectional isometric view of an embodiment of the optic lens showing three distinct refractive surfaces.

FIG. 3 is a cross-sectional isometric view of an embodiment of the optic lens 29 of the present invention. The downwardly extending frustoconical sidewall 45 from flange 43 is shown in detail. The frustoconical sidewall 45 has an outer prismatic surface comprising a radial lens 46. Radial lens 46 is a partial fresnel lens comprised of a convex facet 51 and a series of outwardly extending flat sided facets 52 interposed with depending convex facets 53. Convex portion 51 and depending convex facets 53 refract a lower portion of light from lamp 27 into a partial spherical pattern having a main beam 49, wherein the main beam is approximately 50° to 90°, more desirably from 60° to 80°, and yet more advantageously from 65° to 75° from nadir 12.

FIG. 3 also shows the detail of the disc shaped lower refracting lens 47. Lower refracting lens 47 has a flat or planar lower surface 54 and an upper surface ringed with ridges that diffuse the down light from lamp 27. These ridges are comprised of a series of equally spaced concentric rings having an upwardly sloped planar facet 55 and a downwardly sloped planar facet 56. Additionally, the ribbed interior of frustoconical sidewall 45 is shown to be comprised of a series of rounded partial cylindrical facets 57 extending from flange 43 to lower refracting surface 47.

Figure 4:
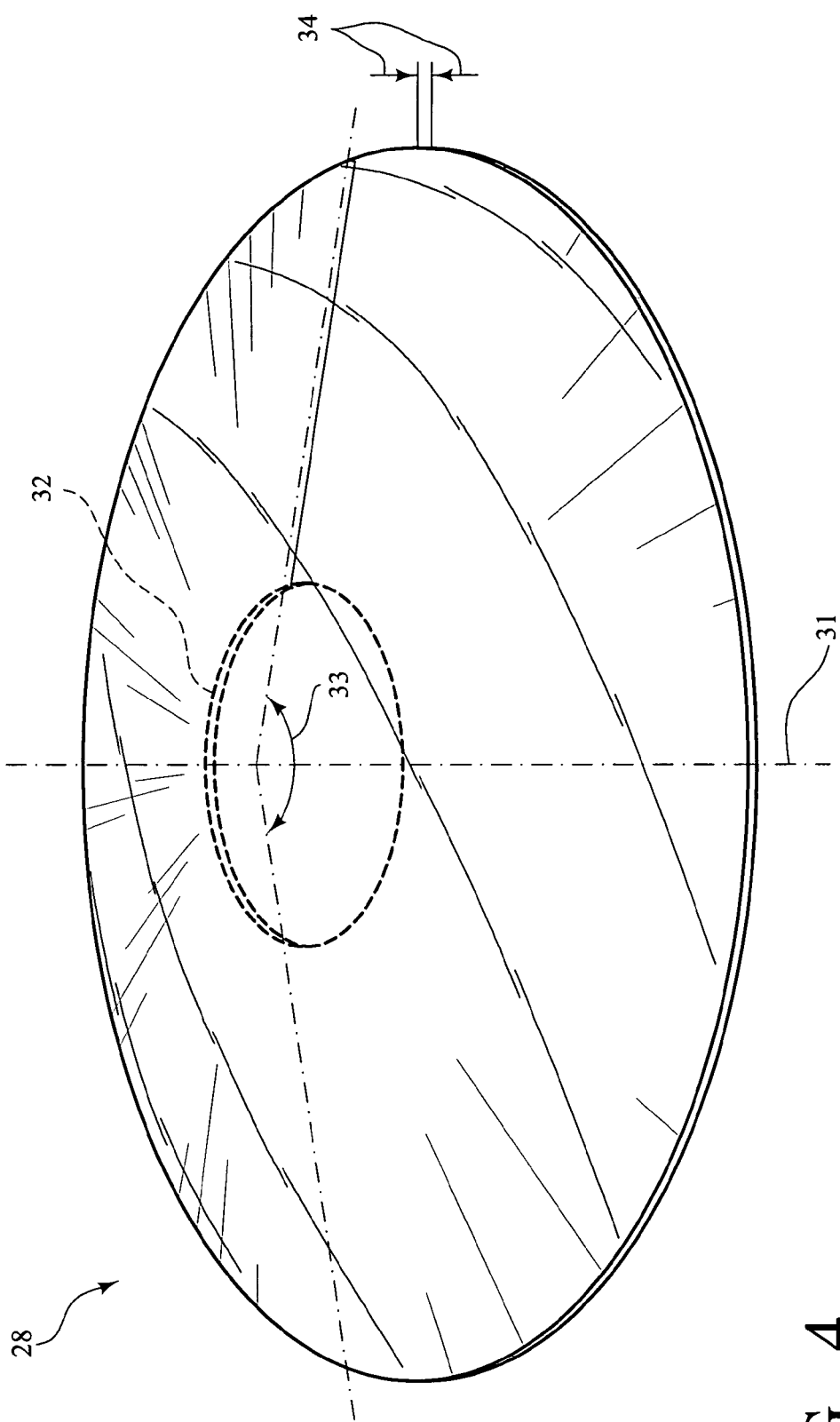
FIG. 4 is an isometric view of two alternative embodiments of the lower lens of the present invention.

FIG. 4 is an isometric view of the lower inverted conical lens 28 of the present invention. Lower inverted conical lens 28 of the present invention may or may not have hole 32 for receiving a lower portion of lamp 27 or optic lens 29. This lens is designed to improve the efficiency of the luminaire and replaces the flat and sag lenses in the prior art. The cone angle 33 of lens 28 is such that the incident light being reflected from axial reflector 25 is closer to normal or 90° than that of a flat bottom lens as used in the prior art and thus improves the efficiency of the luminaire. Cone angle 33 is typically between approximately 130°–175°, advantageously 135°–170°, and more advantageously 140°–150°. The lower inverted conical lens 28 has constant thickness 34 which allows the light reflected from axial reflector 25 to continue through lens 28 toward a desired direction which has a main beam being approximately 70° from nadir. In addition to the improved efficiency over the prior art's flat lens, conical lens 28 does not exhibit the unpleasant glare of the sag lens of the prior art.

Figure 5:
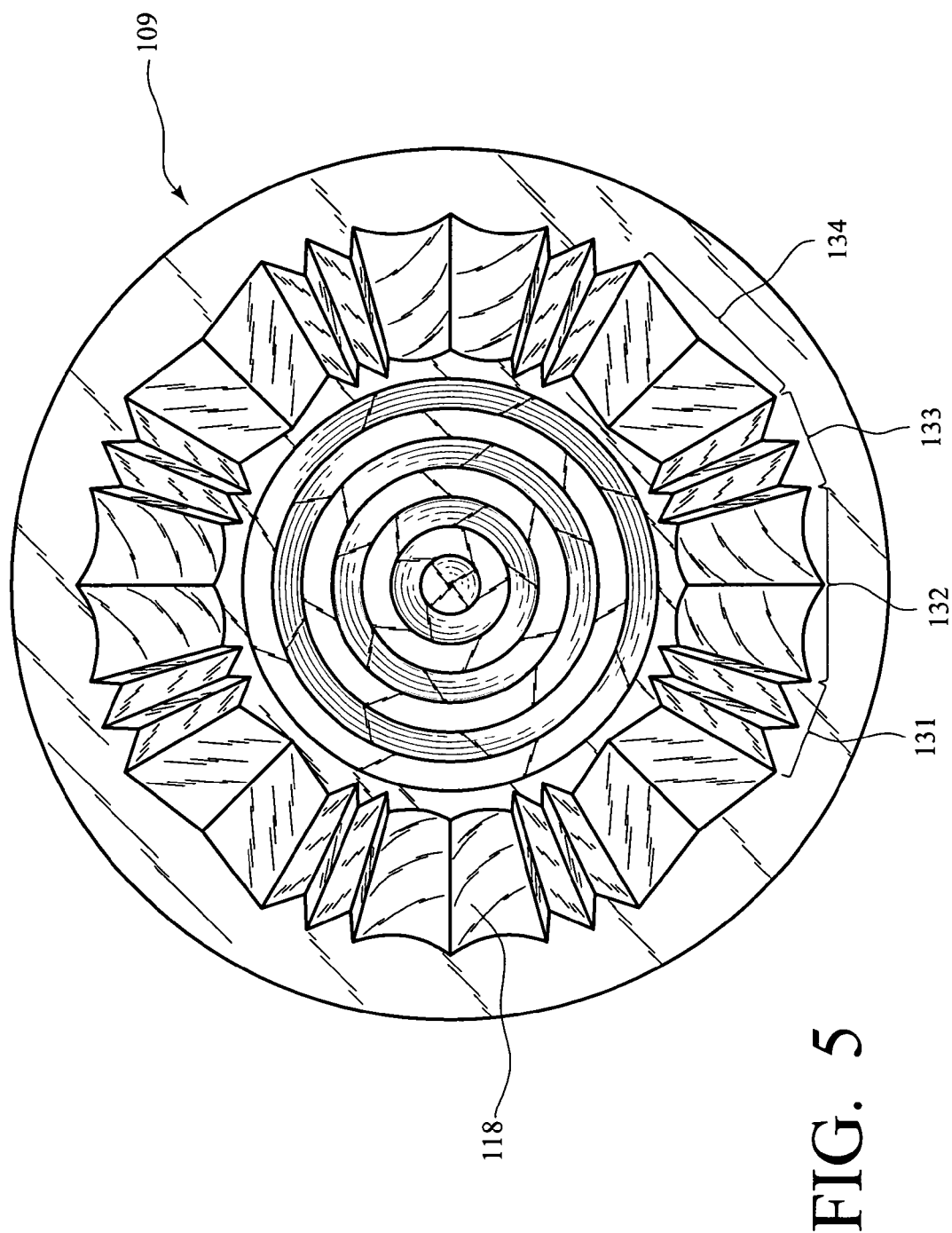
FIG. 5 is a top view of an alternative embodiment of the optic lens of the present invention.

FIG. 5 is a top view of an alternative embodiment of the optic lens 29 of the present invention. In this alternative embodiment the inner wall 118 is comprised of four separate features that produce a rectangular lighting pattern on the area of illumination. These features comprise a pair of convex ridges or partial cylindrical shaped ridges 132 having rounded surfaces. On each side of cylindrical shaped ridges 132 are two distinct pairs of saw tooth ridges 131 & 133. Saw tooth ridges 131 have a flat facet facing the cylindrical shaped ridges 132 that is shorter than the appending flat facet of the saw tooth. Saw tooth ridges 133 are located on the opposite side of cylindrical shaped ridges 132 and also have a shorter appending flat facet facing the cylindrical shaped ridges 132. Interposed between the two pairs of saw tooth ridges 131 and 133 is a ridge having two flat facets 134 which are equal in length. This embodiment of inner wall 118 provides for a rectangular dispersion pattern of light so that a plurality of luminaires may be spatially placed to illuminate a large surface area without having overlapping lighting patterns. Thus, a more efficient lighting of a large area may be accomplished.

Figure 6:
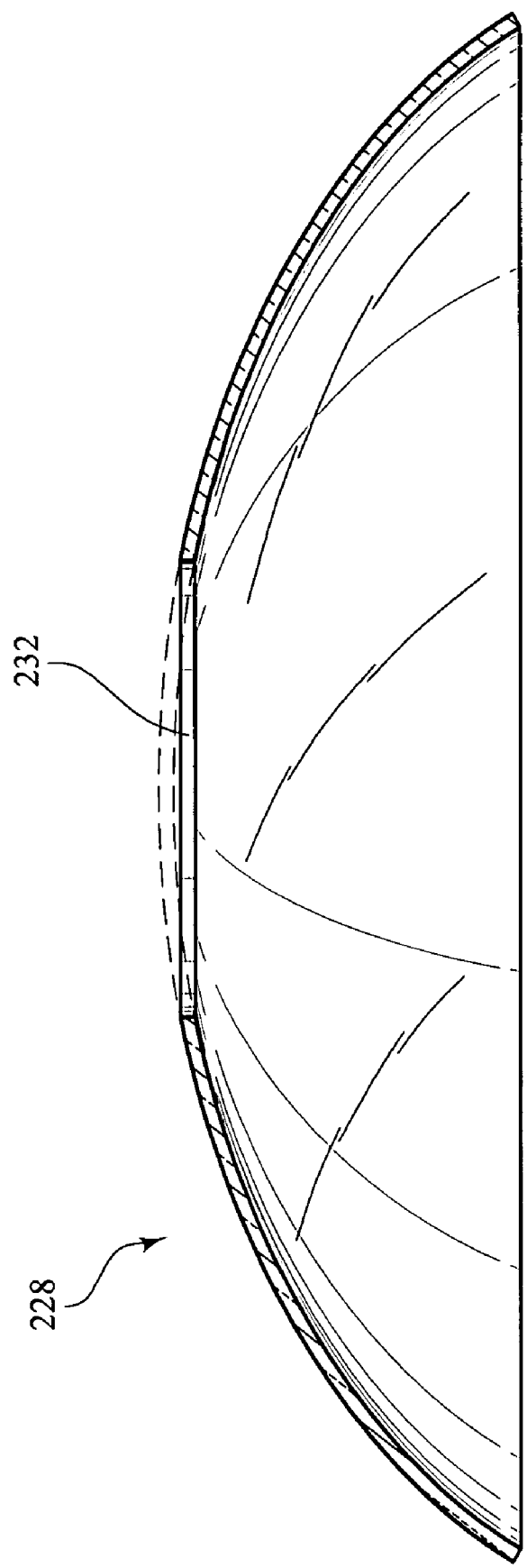
FIG. 6 is a cross-sectional view of two additional embodiments of the lower lens.

FIG. 6 is a cross-sectional view of two additional or alternative embodiments of the lower lens. These embodiments are comprised of an inverted sag lens 228. Such a configuration presents a cost savings over the inverted conical lens in the manufacturing process of the full cutoff luminaire. The inverted sag lens may or may not have hole 232 for receiving a lower portion of lamp 27 and/or optic lens 29.

Figure 7:
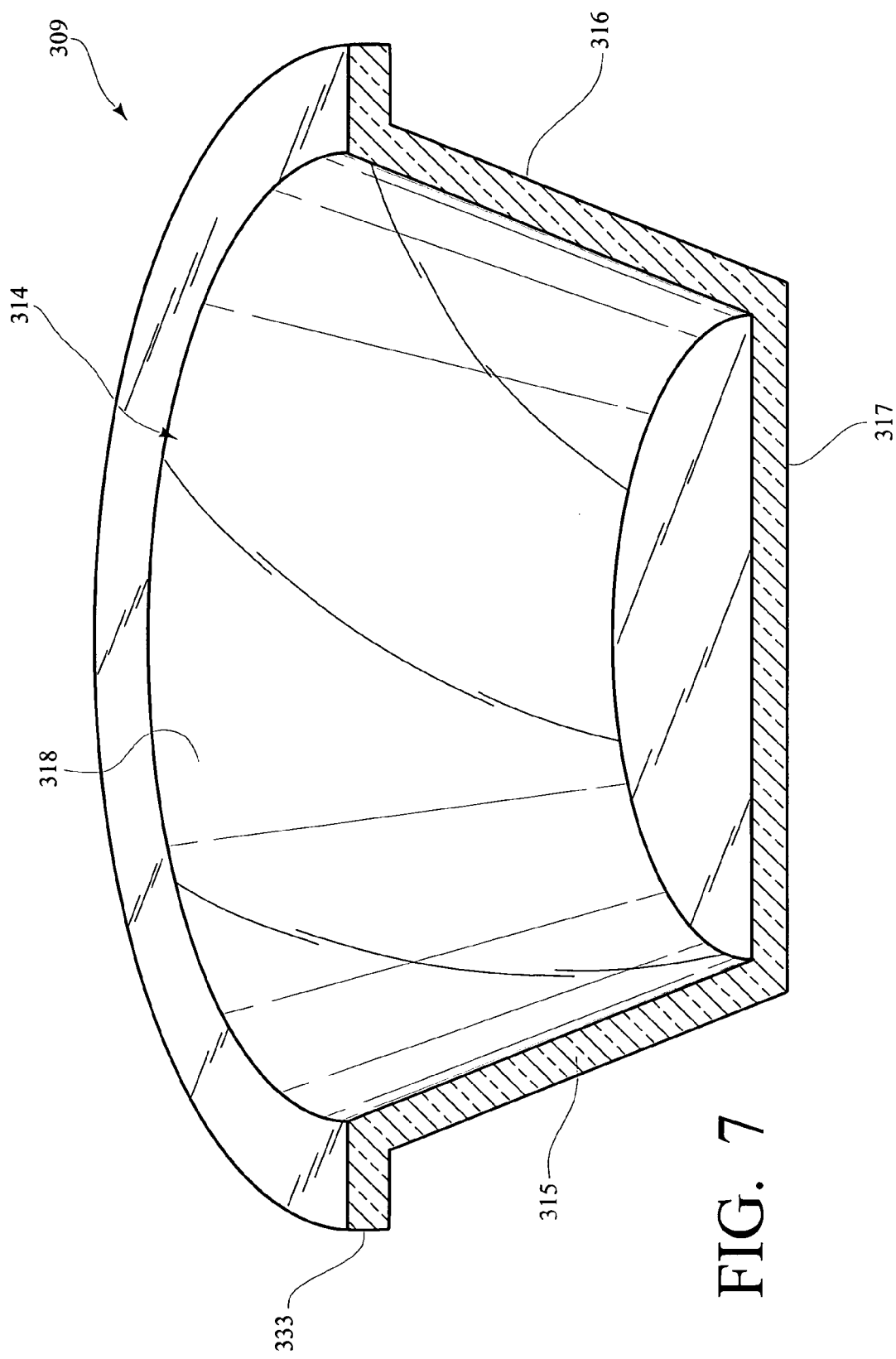
FIG. 7 is a cross-sectional view of an alternative embodiment of the optic lens of the present invention.

FIG. 7 is a cross-sectional view of an alternative embodiment of the optic lens of the present invention. This embodiment comprises a frustoconical sidewall 315, bottom disc wall 317, and flange 333. This configuration forms cavity 314. Optic lens 309 has smooth inner surface side wall 318 and smooth outer surface 316. This embodiment of the optic lens has a wall of constant thickness and presents a cost savings in the manufacturing process of the full cutoff luminaire.

Figure 8:
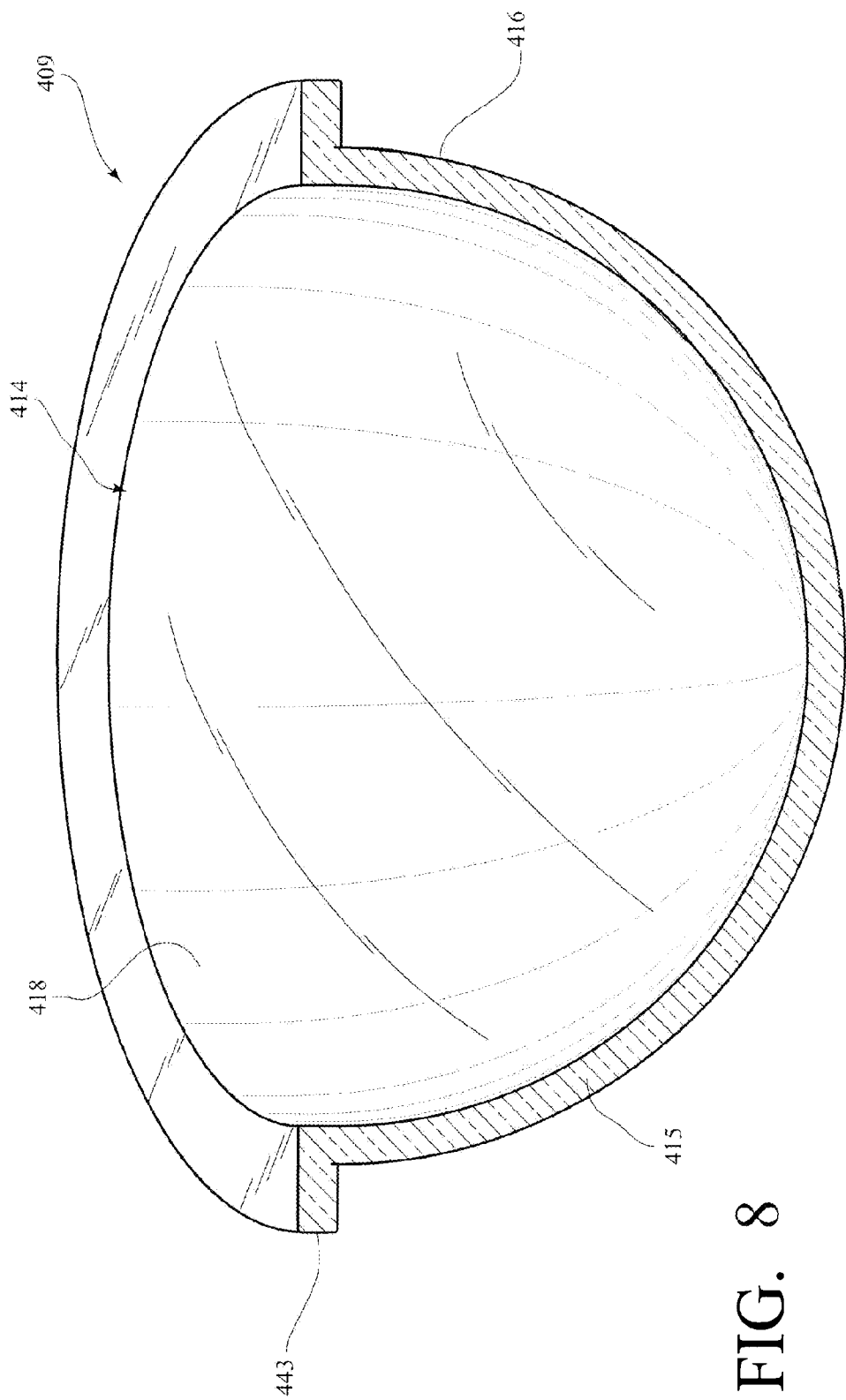
FIG. 8 is a cross-sectional view of an alternative embodiment of the optic lens of the present invention.

FIG. 8 is a cross-sectional view of an alternative embodiment of the optic lens of the present invention. This embodiment comprises a bowl or inverted sag lens 409 having sidewall 415 and flange 443. Sidewall 415 has a constant thickness and a smooth inner surface 418 and a smooth outer surface 416. The bowl shaped lens 409 forms cavity 414. This embodiment of the optic lens also presents a cost savings over the optic lens depicted in FIG. 2 in the manufacturing process of the full cutoff luminaire.

Additionally, the alternative embodiments of the optic lens depicted in FIGS. 7 and 8 provide for alternative refracting properties that may be incorporated into the full cutoff luminaire of the present invention.

What we claim is:

1. A full cutoff luminaire comprising:
   a housing having a vertically mounted centrally located lamp holder forming a lamp region;
   at least two reflectors wherein said at least two reflectors has a first and second reflector, said first reflector substantially surrounds a central portion of said lamp region and said second reflector substantially surrounds an upper portion of said lamp region, said first and said second reflectors having surfaces substantially reflecting light from said lamp region directly to a predefined area below said full cutoff luminaire;
   at least one lens wherein said at least one lens has a first lens substantially surrounding a lower central portion of said lamp region, said first lens redirecting light from a lower portion of said lamp region directly to a predefined area below said full cutoff luminaire; and
   said first lens has a frustoconical sidewall having an inner surface, an outer surface, a top of a first circumference, and a bottom of a second circumference, said first circumference being greater than said second circumference, said bottom being enclosed with a disc shaped lens having a top surface and a bottom surface, said outer surface of said furstoconical sidewall has a partial fresnel lens with a convex facet at said top of said sidewall and a series of outwardly extending flat facets being interposed with depending convex facets.

2. The full cutoff luminaire of claim 1 wherein said inner surface of said frustoconical sidewall has a series of partial cylindrical facets extending from said bottom to said top of said frustoconical sidewall.

3. The full cutoff luminaire of claim 1 wherein said luminaire has a second lens, said second lens is a lower inverted partial conical shaped lens.

4. The full cutoff luminaire of claim 1 wherein said inverted partial conical shaped lens has a cone angle between approximately 130° to 175°.

5. The full cutoff luminaire of claim 1 wherein said inverted partial conical shaped lens has a cone angle between approximately 135° to 170°.

6. The full cutoff luminaire of claim 1 wherein said inverted partial conical shaped lens has a cone angle between approximately 140° to 150°.

7. The full cutoff luminaire of claim 1 wherein said luminaire has a second lens, said second lens is a lower inverted bowl shaped lens.

8. A full cutoff luminaire comprising:
   a housing having a vertically mounted centrally located lamp holder forming a lamp region;
   at least two reflectors wherein said at least two reflectors has a first and second reflector, said first reflector substantially surrounds a central portion of said lamp region and said second reflector substantially surrounds an upper portion of said lamp region, said first and said second reflectors having surfaces substantially reflecting light from said lamp region directly to a predefined area below said full cutoff luminaire;
   at least one lens wherein said at least one lens has a first lens substantially surrounding a lower central portion of said lamp region, said first lens redirecting light from a lower portion of said lamp region directly to a predefined area below said full cutoff luminaire;
   said first lens has a frustoconical sidewall having an inner surface, an outer surface, a top of a first circumference, and a bottom of a second circumference, said first circumference being greater than said second circumference, said bottom being enclosed with a disc shaped lens having a top surface and a bottom surface;
   said inner surface of said frustoconical sidewall comprises:
   at least one pair of convex ridges extending from said bottom to said top of said frustoconical sidewall;
   a pair of saw tooth ridges appending from each side of said convex ridges, wherein said saw tooth ridges have a flat facet facing the convex ridges and an appending flat facet opposite said convex ridges, said ridges facing said convex ridges having a smaller planar area than said appending ridges opposite said convex side; and
   a ridge having two flat facets of equal planar area interposed between said pairs of saw tooth ridges.

9. The full cutoff luminaire of claim 8 wherein said disc shaped lens has a planar lower surface and a prismatic upper surface.

10. The full cutoff luminaire of claim 9 wherein said prismatic upper surface comprises a plurality of equally spaced concentric rings having an upwardly sloped planar facet and appending downwardly sloped planar facet.

11. The full cutoff luminaire of claim 8 wherein said luminaire has a second lens, said second lens is a lower inverted partial conical shaped lens.

12. The full cutoff luminaire of claim 11 wherein said inverted partial conical shaped lens has a cone angle between approximately 130° to 175°.

13. The full cutoff luminaire of claim 11 wherein said inverted partial conical shaped lens has a cone angle between approximately 135° to 170°.

14. The full cutoff luminaire of claim 11 wherein said inverted partial conical shaped lens has a cone angle between approximately 140° to 150°.

15. The full cutoff luminaire of claim 8 wherein said luminaire has a second lens, said second lens is a lower inverted bowl shaped lens.

16. A full cutoff luminaire comprising:
   a housing having a vertically mounted centrally located lamp holder forming a lamp region;

at least two reflectors wherein said at least two reflectors has a first and second reflector, said first reflector substantially surrounds a central portion of said lamp region and said second reflector substantially surrounds an upper portion of said lamp region, said first and said second reflectors having surfaces substantially reflecting light from said lamp region directly to a predefined area below said full cutoff luminaire;

at least one lens wherein said at least one lens has a first lens substantially surrounding a lower central portion of said lamp region, said first lens redirecting light from a lower portion of said lamp region directly to a predefined area below said full cutoff luminaire;

said luminaire has a second lens, said second lens is a lower lens having a hole substantially near the center of said lower lens forming an optic lens region;

said first lens depending downwardly from said second lens at said optic lens region; and said first lens has an inner surface and an outer surface, said inner surface has a lens that redirects light in a radial direction, said outer surface has a lens that redirects light in a vertical direction.

17. The full cutoff luminaire of claim 16 wherein said luminaire has a second lens, said second lens is a lower inverted partial conical shaped lens.

18. The full cutoff luminaire of claim 16 wherein said inverted partial conical shaped lens has a cone angle between approximately 130° to 175°.

19. The full cutoff luminaire of claim 16 wherein said inverted partial conical shaped lens has a cone angle between approximately 135° to 170°.

20. The full cutoff luminaire of claim 16 wherein said inverted partial conical shaped lens has a cone angle between approximately 140° to 150°.

21. The full cutoff luminaire of claim 16 wherein said luminaire has a second lens, said second lens is a lower inverted bowl shaped lens.

* * * * *